United States Patent
Kim (10) Patent No.: US 7,663,785 B2
(45) Date of Patent: Feb. 16, 2010

(54) LIGHT SCANNING UNIT AND ELECTROPHOTOGRAPHIC IMAGE FORMING APPARATUS INCLUDING THE SAME

(75) Inventor: Hyung-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 11/588,297

(22) Filed: Oct. 27, 2006

(65) Prior Publication Data
US 2007/0297024 A1 Dec. 27, 2007

(30) Foreign Application Priority Data
Jun. 21, 2006 (KR) .................. 10-2006-0055913

(51) Int. Cl.
*H04N 1/04* (2006.01)
(52) U.S. Cl. .................. 358/481; 358/296; 358/509; 358/474
(58) Field of Classification Search .......... 358/481, 358/296, 509, 474, 475; 347/241; 359/204
See application file for complete search history.

(56) References Cited

U.S. PATENT DOCUMENTS

| 6,046,835 | A * | 4/2000 | Yamawaki et al. ....... 359/205.1 |
| 6,201,561 | B1 * | 3/2001 | Ichikawa .................... 347/241 |
| 2004/0051771 | A1 | 3/2004 | Eom et al. |

FOREIGN PATENT DOCUMENTS

| JP | 09-015517 | 1/1997 |
| JP | 2000-043324 | 2/2000 |
| JP | 2005-164997 | 6/2005 |

* cited by examiner

*Primary Examiner*—Houshang Safaipour
(74) *Attorney, Agent, or Firm*—Roylance, Abrams, Berdo & Goodman, L.L.P.

(57) ABSTRACT

Provided are a light scanning unit and an electrophotographic image forming apparatus including the light scanning unit. The light scanning unit includes a light source, a polygonal mirror deflecting light emitted from the light source in a main scanning direction, an imaging lens transmitting the deflected light to a photoconductor for forming an image, and a synchronization detecting unit detecting a synchronization signal from the deflected light for synchronization in the main scanning direction. The light scanning unit has a total scanning rate, including a synchronization detecting optical path, ranging from about 60% to 75%.

21 Claims, 7 Drawing Sheets

LIGHT SCANNING UNIT AND ELECTROPHOTOGRAPHIC IMAGE FORMING APPARATUS INCLUDING THE SAME

CROSS-REFERENCE TO RELATED PATENT APPLICATION

This application claims the benefit under 35 U.S.C. §119(a) of Korean Patent Application No. 10-2006-0055913, filed on Jun. 21, 2006, in the Korean Intellectual Property Office, the entire disclosure of which is hereby incorporated by reference.

BACKGROUND OF THE INVENTION

1. Field of the Invention

The present invention relates to a light scanning unit for irradiating light onto a photoconductor, and an electrophotographic image forming apparatus including the light scanning unit. More particularly, the present invention relates to a light scanning unit with a long focal length from an image lens to a photoconductor, and an electrophotographic image forming apparatus including the light scanning unit.

2. Description of the Related Art

In an electrophotographic image forming apparatus, a light scanning unit is used to irradiate light corresponding to image data onto a photoconductor for forming an electrostatic latent image on the photoconductor. A developing unit develops the electrostatic latent image into a visible image. The developing unit contains toner having a predetermined color.

In an image forming apparatus forming an image using a single color, a single light scanning unit is used, and in a color image forming apparatus four light scanning units are usually used for forming electrostatic latent images corresponding to black (K), yellow (Y), magenta (M), and cyan (C) image data. Alternatively, some color image forming apparatuses use a single light scanning unit that can emit four different light beams corresponding to black (K), yellow (Y), magenta (M), and cyan (C) image data sequentially, or two light scanning units each emitting two different light beams corresponding to two colors of image data sequentially.

Generally, in a light scanning unit, a focal length is defined from an imaging lens to a photoconductor. The developing unit of an image forming apparatus is replaced with a new one when the toner contained in the developing unit is consumed. To reduce the replacing frequency of the developing unit, the amount of toner contained in the developing unit should be increased and thus the size of the developing unit should be enlarged. To increase the size of the developing unit, the focal length of the light scanning unit should be long. Meanwhile, the resolution of a light scanning unit can be expressed by the following equation: $d = k \times \lambda \times L/D$, where d is the resolution, k is a proportional constant ranging from 1.2 to 2.0, $\lambda$ is the wavelength of light, L is a focal length, and D is the effective thickness defined in a sub-scanning direction for an optical component, such as an imaging lens. To realize a long-focal-length light scanning unit, the focal length L should be large. In this case, the effective thickness D increases in proportion to the focal length L. Although optical components having a larger effective thickness should be manufactured more precisely, state of the art optical components, such as imaging lenses, are manufactured by plastic injection molding, and thus it is very difficult to manufacture precise optical components having a large effective thickness. Furthermore, optical components having a large effective thickness are sensitive to environmental conditions, such as temperature, thereby increasing the possibility of image quality deterioration.

Accordingly, a need exists for an electrophotographic image forming apparatus having an improved light scanning unit that has a long focal length.

SUMMARY OF THE INVENTION

The exemplary embodiments of the present invention provide a long-focal-length light scanning unit having a stable optical performance by restricting an increase in effective thickness of the optical component in the light scanning unit, and an electrophotographic image forming apparatus including the long-focal-length light scanning unit.

According to an aspect of the present invention, a light scanning unit includes a light source, a polygonal mirror deflecting light emitted from the light source in a main scanning direction, an imaging lens transmitting the deflected light to a photoconductor for forming an image, and a synchronization detecting unit detecting a synchronization signal from the deflected light for synchronization in the main scanning direction. The light scanning unit has a total scanning rate E1 comprising a synchronization detecting optical path and ranging from about 60% to 75%. The total scanning rate is defined as follows:

$$E1 = \frac{\theta 1}{\frac{360}{N} \times 2} \times 100$$

where $\theta 1$ is a total scanning angle, and N is the number of reflection surfaces of the polygonal mirror.

According to another aspect of the present invention, an electrophotographic image forming apparatus includes a photoconductor, a light scanning unit forming an electrostatic latent image on the photoconductor by scanning the photoconductor with light, and a developing unit developing the electrostatic latent image by applying toner to the electrostatic latent image. The light scanning unit includes a light source, a polygonal mirror deflecting light emitted from the light source in a main scanning direction, an imaging lens transmitting the deflected light to the photoconductor for forming the electrostatic latent image, and a synchronization detecting unit detecting a synchronization signal from the deflected light for synchronization in the main scanning direction. The light scanning unit has a total scanning rate E1 comprising a synchronization detecting optical path and ranging from about 60% to 75%. The total scanning rate is defined as follows:

$$E1 = \frac{\theta 1}{\frac{360}{N} \times 2} \times 100$$

where $\theta 1$ is a total scanning angle, and N is the number of reflection surfaces of the polygonal mirror.

The light scanning unit may have an effective scanning rate E2 excluding the synchronization detecting optical path and ranging from about 60% to 70%. The effective scanning rate may be defined as follows:

$$E2 = \frac{\theta 2}{\frac{360}{N} \times 2} \times 100$$

where θ2 is an effective scanning angle.

The synchronization detecting optical path may be defined before the deflected light reaches the imaging lens.

The polygonal mirror may have six reflection surfaces.

A circle circumscribed by the polygonal mirror comprising the six reflection surfaces may have a diameter of 30 mm or less. The imaging lens may include an fθ lens that has at least one non-spherical surface with a curvature continuously varying in a sub-scanning direction.

The light source may emit a plurality of light beams to form a plurality of scanning lines on the photoconductor. The scanning lines may be spaced apart from each other in a sub-scanning direction.

The developing unit may have a shape elongated in a scanning direction of the light scanning unit.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

The present invention will now be described more fully with reference to the accompanying drawings, in which exemplary embodiments of the invention are shown.

Figure 1:
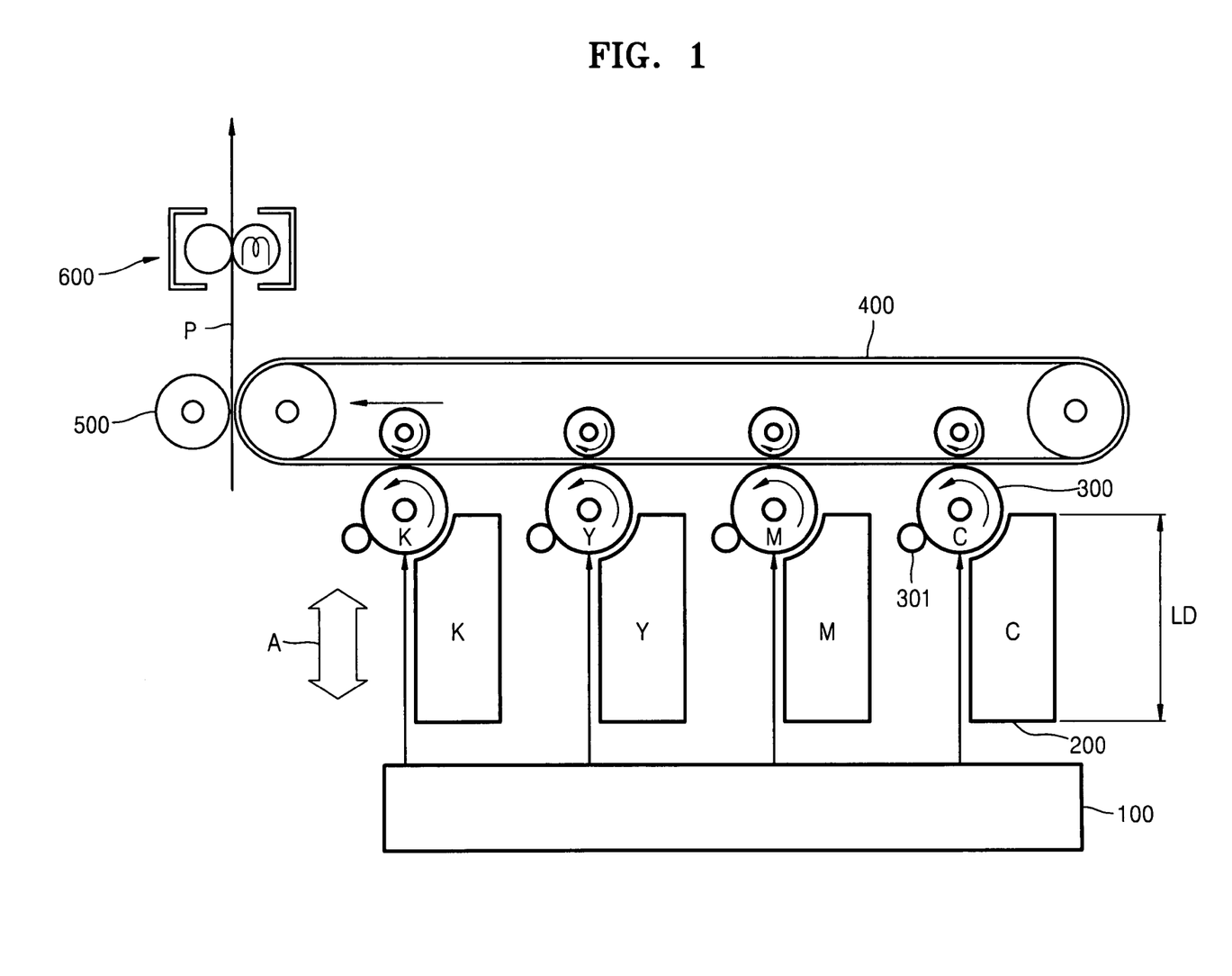
FIG. 1 shows a structure of an electrophotographic image forming apparatus according to an exemplary embodiment of the present invention.

FIG. 1 shows a structure of an electrophotographic image forming apparatus according to an exemplary embodiment of the present invention. Referring to FIG. 1, the electrophotographic image forming apparatus includes a plurality of photoconductive drums 300, a plurality of charge rollers 301, a light scanning unit 100, a plurality of developing units 200, an intermediate transfer belt 400, a transfer roller 500, and a fusing unit 600.

The photoconductive drums 300 are examples of photoconductors. Each of the photoconductive drums 300 includes a hollow cylindrical metal pipe and a photoconductive layer of a predetermined thickness formed on an outer surface of the metal pipe. Alternatively, a photoconductive belt may be used instead of the photoconductive drums 300. The charge rollers 301 make contact with the photoconductive drums 300, respectively, and rotate together with the photoconductive drums 300 to uniformly charge the photoconductive drums 300 to a predetermined potential. The charge rollers 301 are examples of chargers. A bias voltage (Vc) is applied to each of the charge rollers 301. Alternatively, a corona charger (not shown) may be used instead of the charge rollers 301. The light scanning unit 100 scans the uniformly-charged photoconductive drums 300 with light corresponding to image data to form electrostatic latent images on the photoconductive drums 300. A laser scanning unit (LSU) using a laser diode as a light source is usually used for the light scanning unit 100.

The developing units 200 contain toner. The toner is transferred from the developing units 200 to the photoconductive drums 300 by applying a developing bias voltage between the developing units 200 and the photoconductive drums 300. Thus, the electrostatic latent images of the photoconductive drums 300 are developed into visible toner images. The toner images are transferred from the photoconductive drums 300 to the intermediate transfer belt 400. Next, when a sheet of paper (P) is fed between the transfer roller 500 and the intermediate transfer belt 400, the toner images are transferred from the intermediate transfer belt 400 to the sheet of paper (P) by applying a transfer bias voltage to the transfer roller 500. The toner images transferred onto the paper (P) are fused on the paper (P) by heat and pressure from the fusing unit 600. In this way, the formation of an image is completed.

For printing a color image, latent images corresponding to black (K), yellow (Y), magenta (M), and cyan (C) image data are formed on the photoconductive drums 300, respectively. Reference numerals 300K, 300Y, 300M, and 300C are used to distinguish the photoconductive drums 300, and the developing units 200 are distinguished in the same manner. The developing units 200K, 200Y, 200M, and 200C supply black (K), yellow (Y), magenta (M), and cyan (C) toner to the photoconductive drums 300K, 300Y, 300M, and 300C, respectively, to form black (K), yellow (Y), magenta (M), and cyan (C) toner images on the photoconductive drums 300K, 300Y, 300M, and 300C, respectively. Then, the black (K), yellow (Y), magenta (M), and cyan (C) toner images are superimposed onto the intermediate transfer belt 400 and then transferred to a sheet of paper (P).

When all toner contained in the developing units 200 is consumed, the developing units 200 are replaced. However, usually, components of the developing units 200 may be reused even after the toner contained in the developing units 200 is used up. Therefore, the more toner contained in the developing units 200 the longer the developing units 200 may be used. Furthermore, maintenance costs may be reduced. The length LD of the developing units 200 may be increased so that more toner may be contained in the developing units 200. The length LD corresponds to the focal length of the light scanning unit 100. That is, the developing units 200 may contain more toner by increasing the focal length of the light scanning unit 100. This may be more significant when the developing units 200 extend in a light scanning direction (A) of the light scanning unit 100.

Figure 2:
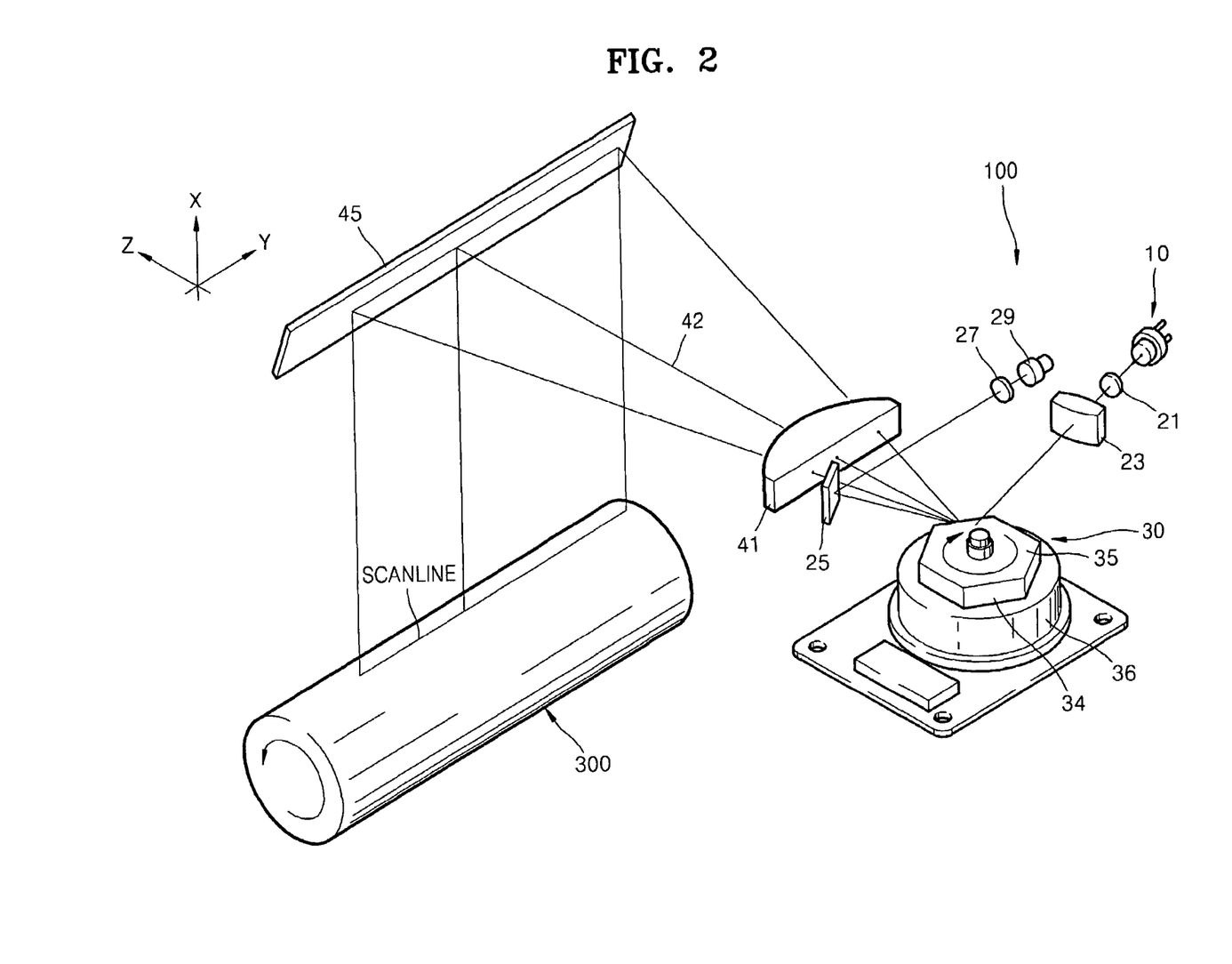
FIG. 2 is a schematic perspective view illustrating an optical arrangement of a light scanning unit used in the electrophotographic image forming apparatus of FIG. 1 according to an exemplary embodiment of the present invention.
Figure 3:
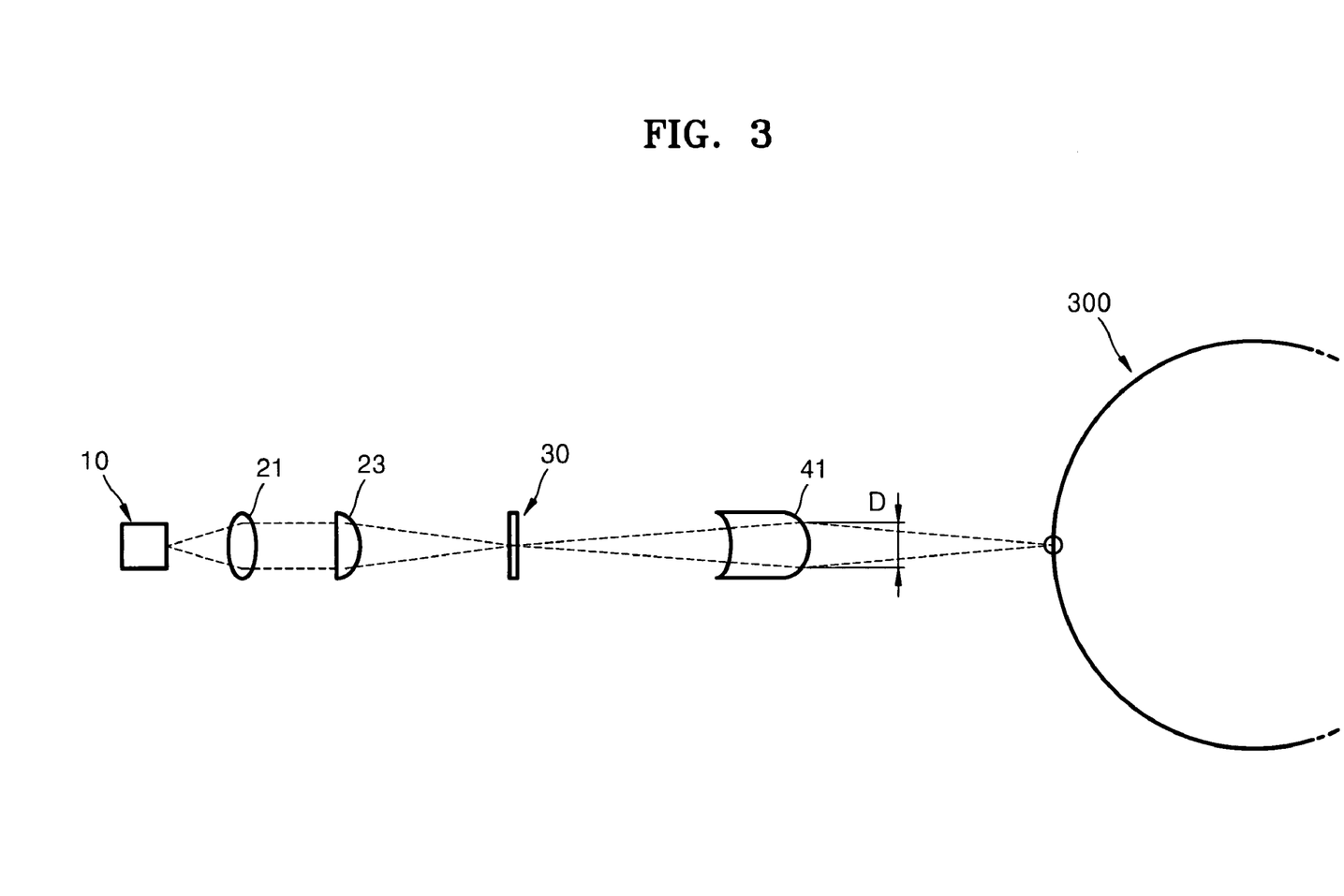
FIG. 3 is a schematic view illustrating an optical path defined in a sub-scanning direction of the light scanning unit of FIG. 2 according to an exemplary embodiment of the present invention.
Figure 4:
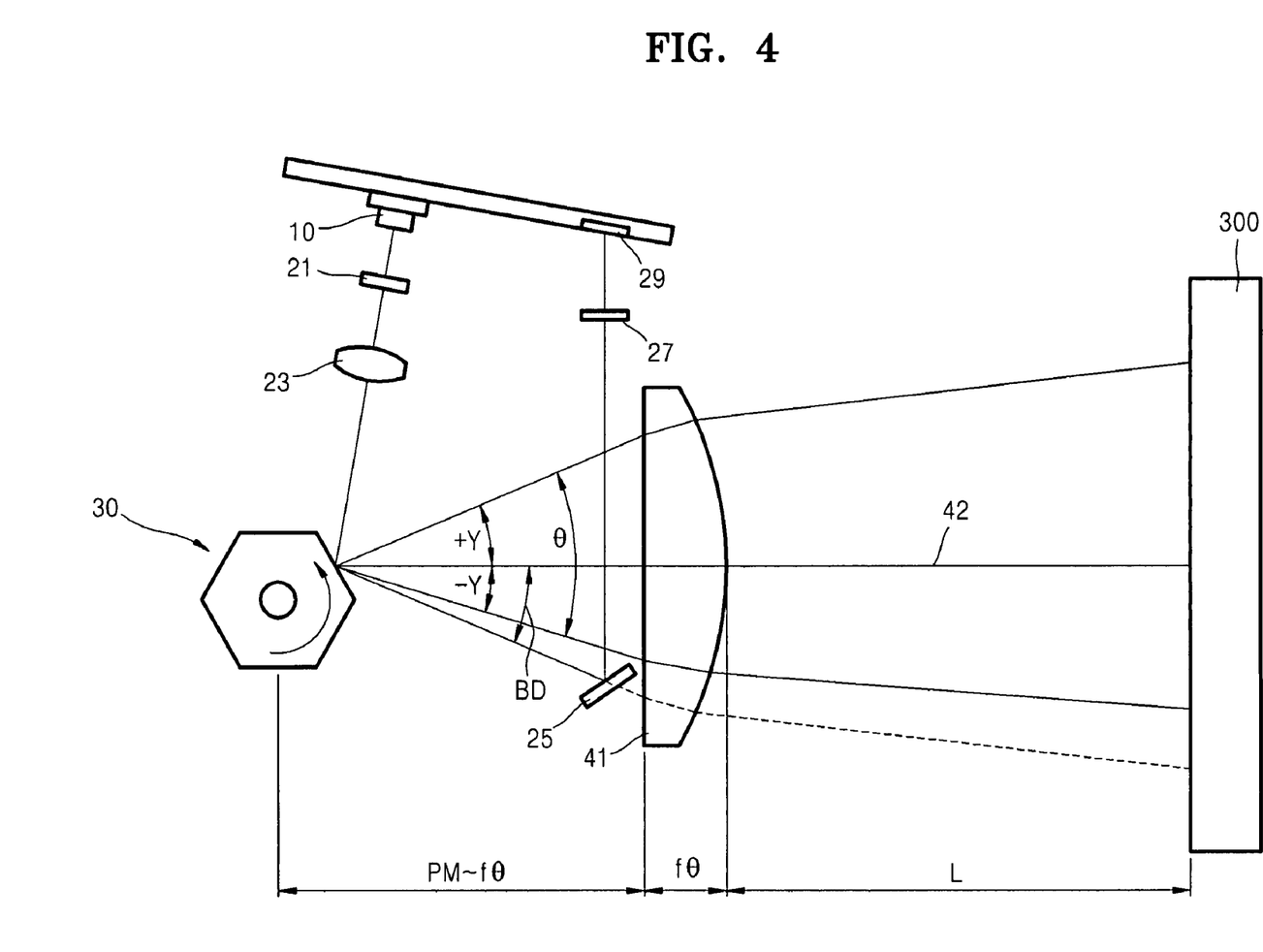
FIG. 4 is a schematic view illustrating an optical path defined in a main scanning direction of the light scanning unit of FIG. 2 according to an exemplary embodiment of the present invention.

FIG. 2 is a schematic perspective view illustrating an optical arrangement of the light scanning unit 100 used in the electrophotographic image forming apparatus of FIG. 1 according to an exemplary embodiment of the present invention. FIG. 3 is a schematic view illustrating an optical path defined in a sub-scanning direction of the light scanning unit 100 of FIG. 2 according to an exemplary embodiment of the present invention. FIG. 4 is a schematic view illustrating an optical path defined in a main scanning direction of the light scanning unit 100 of FIG. 2 according to an exemplary embodiment of the present invention.

Referring to FIGS. 2 through 4, the light scanning unit 100 according to the current exemplary embodiment of the present invention scans a photoconductor 300 with light. The light scanning unit 100 includes a light source 10 and a deflector 30. The light source 10 emits light, and the deflector 30 deflects the light emitted from the light source 10 to scan the photoconductor 300 in a main scanning direction (Y).

For example, a laser diode may be used as the light source 10. The deflector 30, as illustrated in FIG. 2, includes a polygonal mirror 35 with a plurality of reflection surfaces 34 and a motor 36 driving the polygonal mirror 35.

A collimating lens 21 and a cylindrical lens 23 may be disposed in an optical path between the light source 10 and the deflector 30. The collimating lens 21 condenses the light emitted from the light source 10 to make the light parallel or convergent. The cylindrical lens 23 condenses the light transmitted through the collimating lens in the main scanning direction and/or the sub-scanning direction such that the light may be linearly focused on the plurality of reflection surfaces 34 of the deflector 30. The cylindrical lens 23 includes at least one lens.

The light scanning unit 100 may further include an imaging lens and a synchronization signal detecting unit. The imaging lens is used for focusing the light deflected from the deflector 30 onto the photoconductor 300. For example, the imaging lens includes the fθ lens 41 disposed between the deflector 30 and the photoconductor 300. A reflection mirror 45 may be disposed between the fθ lens 41 and the photoconductor 300. The fθ lens 41 is made up of at least one lens. The fθ lens 41 focuses the light deflected from the deflector 30 on the photoconductor 300 with different magnifications in the main scanning direction (Y) and the sub-scanning direction (X) to form a latent image on the photoconductor 300. The fθ lens 41 may be formed of a plastic aspheric lens to reduce the size and the number of required components. The fθ lens 41 includes at least one non-spherical or freeform surface with a curvature varying in the sub-scanning direction (X). The shape of the fθ lens 41 is not limited to that illustrated in FIG. 2. The shape of the fθ lens 41 may be defined by Equation 1 below. The third term of Equation 1 exists because the fθ lens 41 includes at least one non-spherical or freeform surface with a curvature varying in the sub-scanning direction (X). In Equation 1, m and n denote a degree of polynomial Although m and n of Equation 1 are ten, the present invention is not limited thereto.

$$Z = \frac{C_y Y^2}{1 + \sqrt{1 - C_y^2(k_y + 1)Y^2}} + \sum_{m=3}^{10} A_m Y^m + \frac{C_x\left(1 + \sum_{n=3}^{10} B_n Y^n\right)x^2}{1 + \sqrt{1 - C_x^2\left(1 + \sum_{n=3}^{10} B_n Y\right)^2 x^2}}$$

[Equation 1]

The synchronization signal detecting unit receives some of the light emitted from the light source 10 to adjust horizontal synchronization (synchronization in the main scanning direction (Y)). To form a synchronization detecting optical path, some of the light deflected from the deflector 30 is directed to a synchronization signal detecting sensor 29.

The light scanning unit 100 according to the current exemplary embodiment of the present invention is characterized in that the synchronization detecting optical path is defined before the imaging lens. That is, the synchronization detecting optical path is defined between the deflector 30 and the fθ lens 41. Therefore, an optical system with a long focal length may be realized. For this, a reflection mirror 25 reflects some of the light deflected from the deflector 30 to the synchronization signal detecting sensor 29. A condenser lens 27 condenses the light reflected from the reflection mirror 25.

Figure 5:
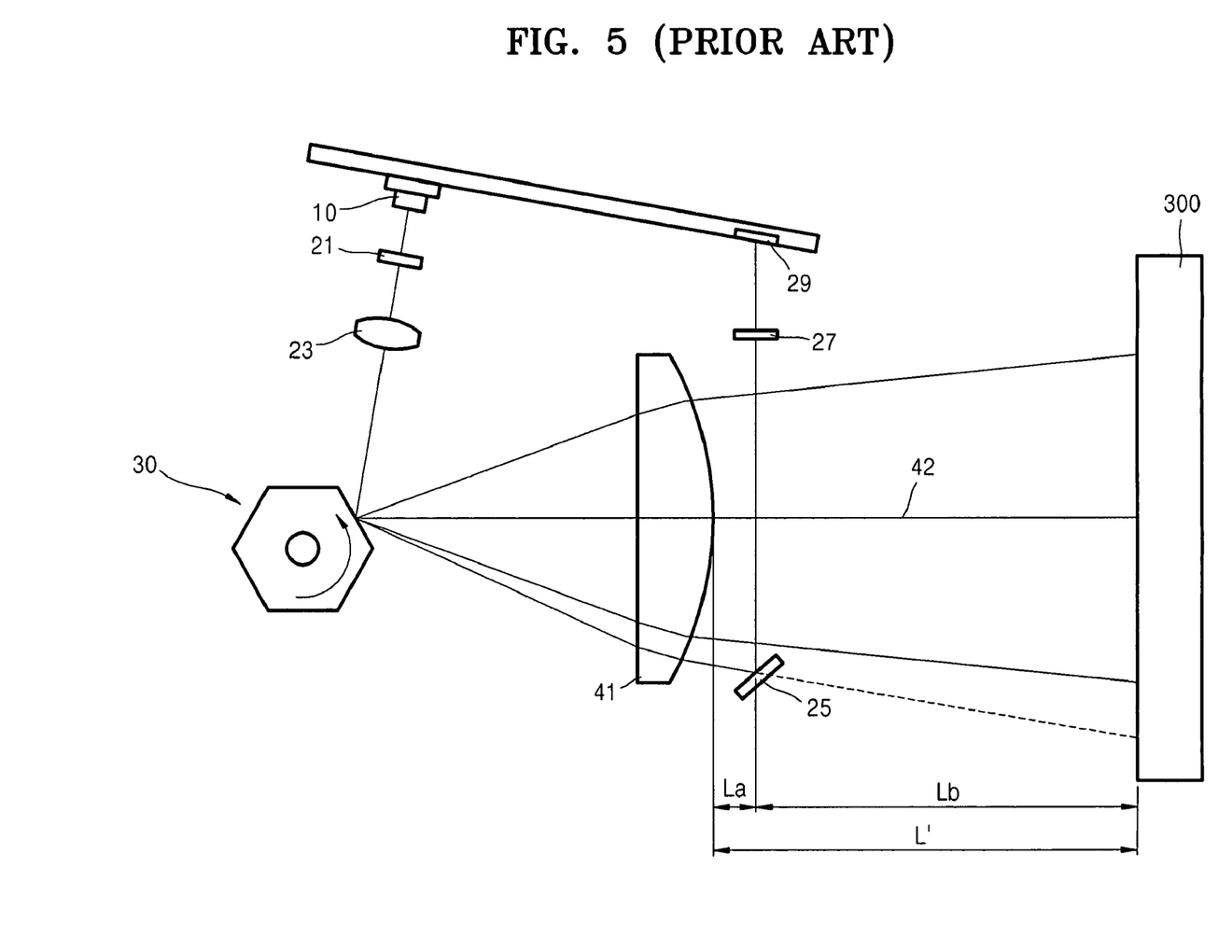
FIG. 5 is a schematic view of a conventional light scanning unit in which a synchronization detecting optical path is defined between an imaging lens and a photoconductor.

The resolution (d) of the light scanning unit 100 may be expressed by the relationship, d=k×λ×L/D, where k is a proportional constant ranging from 1.2 to 2.0, λ is the wavelength of light, L is the focal length of the light scanning unit 100, and D is the effective thickness of an optical component of an optical imaging system defined in the sub-scanning direction (X). Specifically, referring to FIG. 3, the effective thickness D is a thickness of the imaging lens (fθ lens 41) defined in the sub-scanning direction (X). The focal length L is proportional to the effective thickness such that the effective thickness D increases when the focal length L increases. To increase the effective thickness D, optical components of the light scanning unit 100 must be substantially precise, thereby lowering the productivity of the light scanning unit 100. Furthermore, the optical stability of the scanning unit is deteriorated because it is difficult to make precise optical components. Referring to FIG. 5, when the synchronization detecting optical path is defined after the fθ lens 41, a focal length L' of the light scanning unit 100 is equal to the sum of a length La for synchronization detection and a length Lb for obtaining an effective scanning length on the photoconductive drum 300 in the main scanning direction (Y). When FIGS. 4 and 5 are compared, the focal length L of FIG. 4 corresponds to the focal length L' of FIG. 5. In FIG. 5, although the length La for synchronization detection is included in the focal length L', the length La is not related to the effective main scanning length on the photoconductive drums 300. That is, the focal length L' meaninglessly increases by the length La. Therefore, in this case, the effective thickness D is also increased according to the above-described relationship, d=k×λ×L/D. In the light scanning unit 100 according to the current exemplary embodiment of the present invention, the synchronization detecting optical path is defined before the imaging lens, such that the focal length L of the light scanning unit 100 does not increase meaninglessly. Thus, an increase of the effective thickness D may be prevented.

The light scanning unit 100 according to the current exemplary embodiment of the present invention has a total scanning rate E1 of 60% to 75% when the synchronization detecting optical path is included. The total scanning rate E1 of the light scanning unit 100 is defined by Equation 2 below.

$$E1 = \frac{\theta 1}{\frac{360}{N} \times 2} \times 100 \qquad \text{[Equation 2]}$$

where θ1 denotes a total scanning angle (referring to FIG. 4, the sum of +Y and BD) and N denotes the number of the reflection surfaces 34 of the polygonal mirror 35.

Furthermore, the effective scanning rate E2 of the light scanning unit 100 except for the synchronization detecting optical path is defined by Equation 3 below. The effective scanning rate E2 may range from 60% to 70%.

$$E2 = \frac{\theta 2}{\frac{360}{N} \times 2} \times 100 \qquad \text{[Equation 3]}$$

where θ2 denotes an effective scanning angle (referring to FIG. 4, the sum of +Y and −Y).

As explained above, the effective thickness D of optical components (particularly, the effective thickness D of the fθ lens 41) may be minimally maintained by restricting the total scanning rate E1 within the range of 60% to 75% and the effective scanning rate E2 within the range of 60% to 70%. Therefore, according to an exemplary embodiment of the present invention, a light scanning unit having a long focal length may be manufactured using optical lenses (particularly, the fθ lens 41) that may be practically manufactured without difficulty, because it is not required to increase the effective thickness D of the optical components (particularly, the effective thickness of the fθ lens 41). When the total scanning rate E1 and the effective scanning rate E2 are outside the above ranges (for example, larger than the ranges), the effective thickness D of the optical lens must be increased to realize a long-focal-length light scanning unit. This increases the manufacturing costs of the lenses. This relationship between the scanning rates E1 and E2 and the effective thickness D will be described later more specifically with reference to Tables 2 and 3.

Scanning lines formed on the photoconductive drums 300 are biased toward an opposite side to the synchronization detecting optical path with respect to an optical axis 42 of the imaging lens.

The number of the reflection surfaces 34 of the polygonal mirror 35 may be six or more. When the number of the reflection surfaces 34 is less than six, the polygonal mirror 35 is rotated at an extremely high speed to obtain the same printing speed when the number of the reflection surfaces 34 is six or more. A circle circumscribed by the polygonal mirror 35 may have a diameter of 30 mm or less for making the light scanning unit 100 small and light. The thickness of the polygonal mirror 35 may be less than approximately 2 mm.

Specifications of an exemplary light scanning unit having the above-described characteristics are listed in Table 1 below.

TABLE 1

| | | | | | fθ (first side) | fθ (second side) |
|---|---|---|---|---|---|---|
| Wavelength | λ | | 780 | | | |
| Incident angle | (°) | | 70 | Cy | 9.0717E−03 | 3.8005E−03 |
| Polygon mirror | Circumscribed circle | | 30 | Cx | −1.1195E−01 | −9.8546E−02 |
| | Number of reflection surfaces | | 6 | ky | 0 | 0 |
| Scanning angle | +Y(°) | | 42 | A3(+y) | 1.2548E−04 | 1.2690E−04 |
| | −Y(°) | | −33.6 | A3(−y) | 6.3582E−05 | 8.7120E−05 |
| | BD(°) | | −42 | A4...A10 | — | — |
| Optical path | PM-fθ | | 58 | B3(+y) | 2.3268E−31 | −1.8113E−22 |
| | Fθ | | 15 | B3(−y) | 3.8631E−32 | 4.1168E−31 |
| | fθ-photoconductor | | 113 | B4...B10 | — | — |

In this design example, +Y is 42° and −Y is 33.6°. That is, scanning lines are biased to the +Y side based on the optical axis 42, and the synchronization detecting optical path is placed on the −Y side.

Because the total scanning angle θ1 is 84°=42°+42°, the total scanning rate E1 (including the synchronization detecting optical path) is as follows.

$$E1 = \frac{84}{\left(\frac{360}{6} \times 2\right)} \times 100 = 70\%$$

Furthermore, since the effective scanning angle is 75.6°=42°+33.6°, the effective scanning rate E2 (excluding the synchronization detecting optical path) is as follows.

$$E2 = \frac{75.6}{\left(\frac{360}{6} \times 2\right)} \times 100 = 63\%$$

In this case, the focal length L is 113 mm.

Further, the effective thickness is 2.0 mm.

Examples for comparison with the light scanning unit 100 according to the current exemplary embodiment of the present invention are shown in Tables 2 and 3 below. Table 2 shows a comparison example designed such that the synchronization detecting optical path is placed after the imaging lens and the focal length L is 94.2 mm. Table 3 shows another comparison example designed such that the synchronization detecting optical path is placed after the imaging lens and the focal length L is 132 mm.

TABLE 2

| Effective thickness | D(mm) | 1.9 |
|---|---|---|
| fθ-photoconductor | L(mm) | 94.2 |
| Number of polygonal mirror surfaces | N | 6 |
| Diameter of circumscribed circle of polygonal mirror | P(mm) | 40 |
| Effective scanning angle | θ(°) | 91.4 |
| Total scanning angle | θ(°) | 96.6 |
| Effective scanning rate | E2(%) | 76.2 |
| Total scanning rate with sync detecting optical path | E1(%) | 80.5 |

TABLE 3

| Effective thickness | D(mm) | 2.5 |
|---|---|---|
| fθ-photoconductor | L(mm) | 132 |
| Number of polygonal mirror surfaces | N | 6 |
| Diameter of circumscribed circle of polygonal mirror | P(mm) | 40 |
| Effective scanning angle | θ(°) | 90.6 |
| Total scanning angle | θ(°) | 96.4 |
| Effective scanning rate | E2(%) | 75.5 |
| Total scanning rate with sync detecting optical path | E1(%) | 80.3 |

Referring to Tables 2 and 3, when the focal length L is changed from 94.2 mm to 132 mm while maintaining the total scanning rate E1 and the effective scanning rate E2 at substantially the same level, the effective thickness D is increased from 1.9 mm to 2.5 mm (about 31.5%). When the focal length L of the example shown in Table 1 according to the current exemplary embodiment of the present invention is changed from 94.2 mm to 113 mm by about 20%, the effective thickness D is increased from 1.9 mm to 2.0 mm (about only 5%). Therefore, according to the current exemplary embodiment of the present invention, the focal length L of the light scanning unit 100 may be increased without additional costs because the lens required may be practically manufactured without difficulty.

As explained above, in the light scanning unit 100 according to the current exemplary embodiment of the present invention, the focal length L may be increased with minimal increase in the effective thickness D. Therefore, the volume of the developing units 200 may be increased to hold more toner and thus the lifespan of the developing units 200 may be increased.

Figure 6:
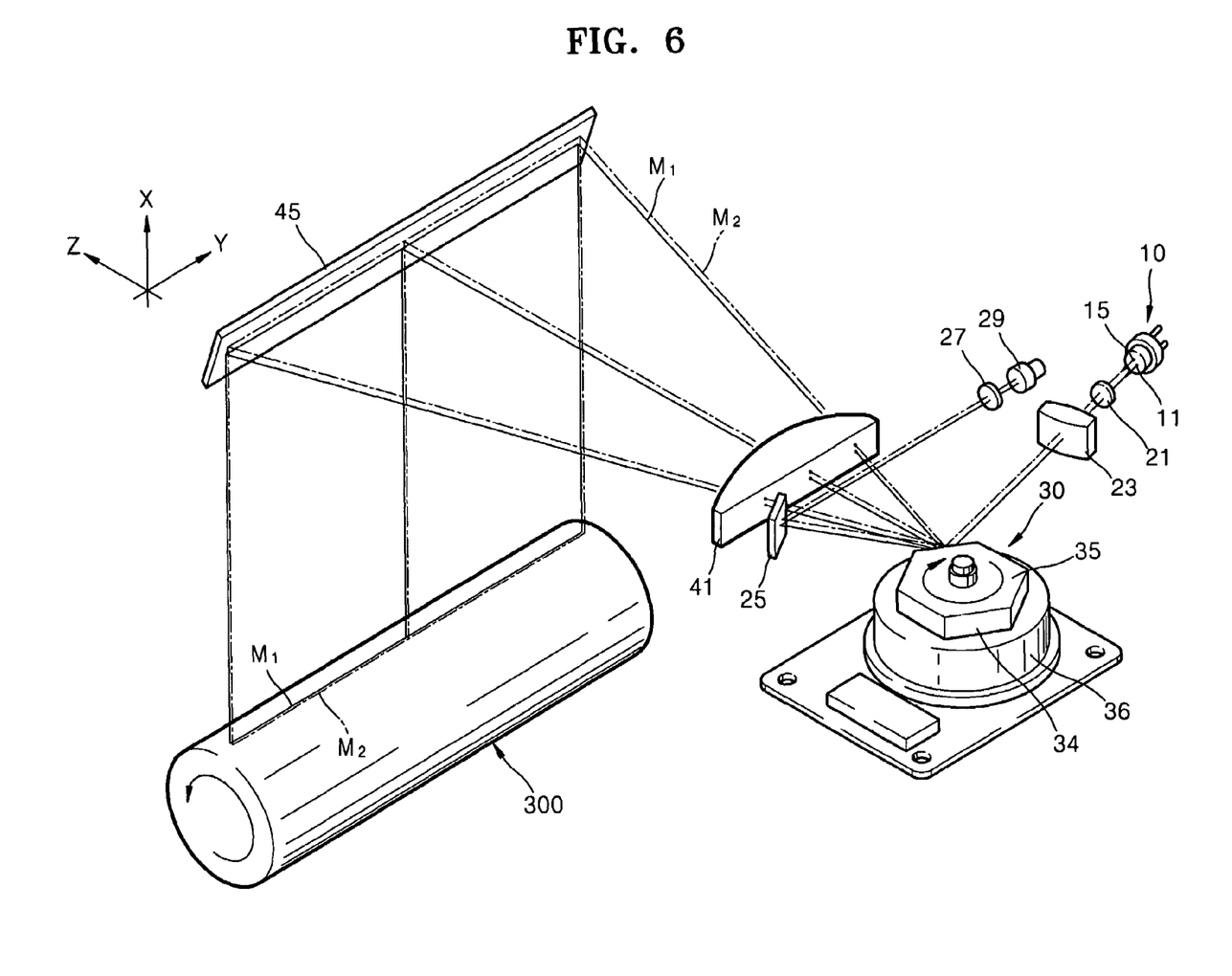
FIG. 6 is a schematic perspective view illustrating an optical arrangement of a light scanning unit used in the electrophotographic image forming apparatus of FIG. 1 according to another exemplary embodiment of the present invention.
Figure 7:
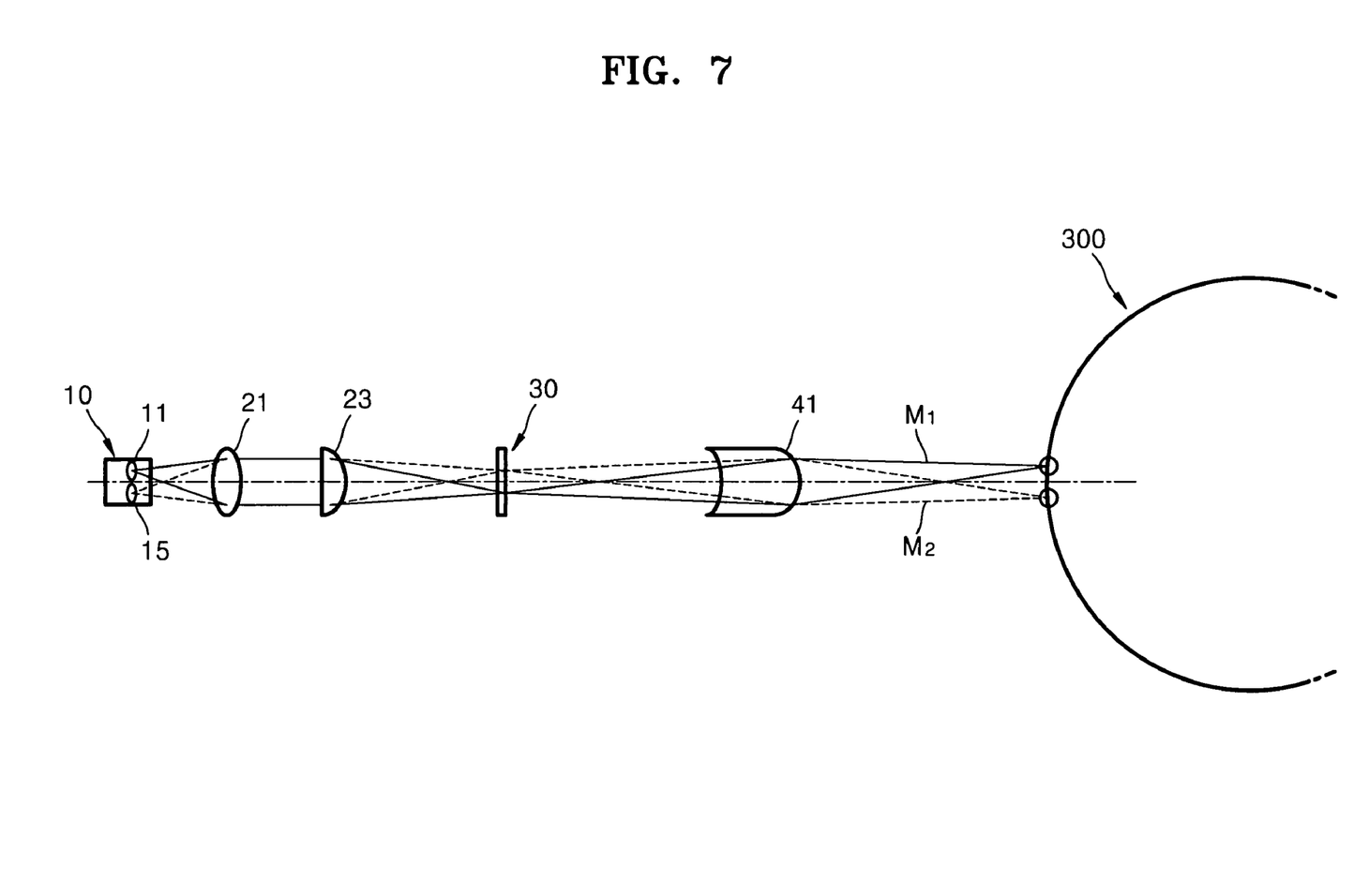
FIG. 7 is a schematic view illustrating an optical path defined in a sub-scanning direction of the light scanning unit of FIG. 6 according to an exemplary embodiment of the present invention.

FIG. 6 is a schematic perspective view illustrating an optical arrangement of the light scanning unit 100 used in the electrophotographic image forming apparatus of FIG. 1 according to another exemplary embodiment of the present invention. Referring to FIG. 6, a light source 10 with a plurality of light-emitting portions may be used. As the light-emitting portions are turned on and off by a driving circuit, the light-emitting portions emit light corresponding to an image signal. In this case, a plurality of scanning lines may be simultaneously formed on the photoconductive drum 300 in the sub-scanning direction (X). For example, the light source 10 may include a first light-emitting portion 11 and a second light emitting portion 15. The first and second light-emitting portions 11 and 15 may be formed of semiconductor lasers, such as edge emitting laser diodes emitting light at a side surface, or vertical cavity surface emitting laser diodes emitting light at a top surface.

Light beams emitted from the first and second light-emitting portions 11 and 15 are guided onto the photoconductive drum 300, simultaneously forming first and second scanning lines M1 and M2 spaced apart from each other in the sub-scanning direction (X). The distance between the first and second scanning lines M1 and M2 in the sub-scanning direction (X) is determined by the distance between the first and second light-emitting portions 11 and 15 and the optical magnification of the optical system (light scanning unit 100). The optical magnification and the distance between the first and second light-emitting portions 11 and 15 are both adjustable. Reduction of the distance between the first and second light-emitting portions 11 and 15 is limited because of the features of the light source 10. Furthermore, it is not easy to increase the distance between the first and second light-emitting portions 11 and 15 due to special and optical limitations. Therefore, practically, the distance between the scanning lines M1 and M2 is adjusted by changing the optical magnification of the light scanning unit 100 or rotating the light source 10 to obtain the same effect as increasing or decreasing the distance between the first and second light-emitting portions 11 and 15. The light source 10 may be rotated about the Z-axis to incline the first and second light-emitting portions 11 and 15 with respect to the sub-scanning direction (X). In this case, the distance between the first and second light-emitting portions 11 and 15 in the sub-scanning direction (X) is decreased. The number of the light-emitting portions of the light source 10 is not limited to two. Two or more light-emitting portions may be formed in the light source 10 to form a plurality of scanning lines simultaneously, thereby increasing printing speed.

Referring again to FIG. 1, the light scanning unit 100 scans the four photoconductive drums 300K, 300Y, 300M, and 300C. For this, four light scanning units having the same configuration as the light scanning unit 100 in FIG. 2 or 6 may be used, or a single light scanning unit having four light sources (not shown) may be used. In the latter case, the deflector 30 may guide light emitted from the four light sources, and the light emitted from each of the four light sources may be guided along substantially the same optical path as shown in FIG. 2 or 4. Besides, various types of light scanning units may be used.

As described above, according to the light scanning unit of the present invention, the focal length of the light scanning unit may be increased with minimal increase in the effective thickness of the light scanning unit. Therefore, a stable long-focal-length light scanning unit may be realized. Furthermore, in the electrophotographic image forming apparatus according to exemplary embodiments of the present invention, including the light scanning unit, the toner-containing capacity of the developing unit may be increased. Therefore, the developing unit may be used for a much longer period of time before having to be replaced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning unit, comprising:
   a light source;
   a polygonal mirror deflecting light emitted from the light source in a main scanning direction;
   an imaging lens transmitting the deflected light to a photoconductor for forming an image; and a synchronization detecting unit detecting a synchronization signal from the deflected light for synchronization in the main scanning direction, wherein the light scanning unit has a total scanning rate E1 including a synchronization detecting optical path and ranging from about 60% to 75%, the total scanning rate E1 being defined as follows, $$E1 = \frac{\theta 1}{\frac{360}{N} \times 2} \times 100$$

where θ1 is a total scanning angle, and N is the number of reflection surfaces of the polygonal mirror.

2. The light scanning unit of claim 1, wherein the light scanning unit has an effective scanning rate E2 excluding the synchronization detecting optical path and ranging from about 60% to 70%, the effective scanning rate E2 being defined as follows, $$E2 = \frac{\theta 2}{\frac{360}{N} \times 2} \times 100$$

where θ2 is an effective scanning angle.

3. The light scanning unit of claim 2, wherein the synchronization detecting optical path is defined before the deflected light reaches the imaging lens.

4. The light scanning unit of claim 1, wherein the polygonal mirror comprises six reflection surfaces.

5. The light scanning unit of claim 4, wherein a circle circumscribed by the polygonal mirror comprising the six reflection surfaces has a diameter of approximately 30 mm or less.

6. The light scanning unit of claim 4, wherein the imaging lens comprises an fθ lens, the fθ lens having at least one non-spherical surface with a curvature continuously varying in a sub-scanning direction.

7. The light scanning unit of claim 1, wherein the light source emits a plurality of light beams to form a plurality of scanning lines on the photoconductor, the scanning lines being spaced apart from each other in a sub-scanning direction.

8. An electrophotographic image forming apparatus, comprising:
a photoconductor;
a light scanning unit forming an electrostatic latent image on the photoconductor by scanning the photoconductor with light; and
a developing unit developing the electrostatic latent image by applying toner to the electrostatic latent image,
wherein the light scanning unit comprises:
a light source;
a polygonal mirror deflecting light emitted from the light source in a main scanning direction;
an imaging lens transmitting the deflected light to the photoconductor for forming the electrostatic latent image; and
a synchronization detecting unit detecting a synchronization signal from the deflected light for synchronization in the main scanning direction,
wherein the light scanning unit has a total scanning rate E1 including a synchronization detecting optical path and ranging from about 60% to 75%, the total scanning rate E1 being defined as follows, $$E1 = \frac{\theta 1}{\frac{360}{N} \times 2} \times 100$$

where θ1 is a total scanning angle, and N is the number of reflection surfaces of the polygonal mirror.

9. The electrophotographic image forming apparatus of claim 8, wherein the light scanning unit has an effective scanning rate E2 excluding the synchronization detecting optical path and ranging from about 60% to 70%, the effective scanning rate E2 being defined as follows, $$E2 = \frac{\theta 2}{\frac{360}{N} \times 2} \times 100$$

where θ2 is an effective scanning angle.

10. The electrophotographic image forming apparatus of claim 9, wherein the synchronization detecting optical path is defined before the deflected light reaches the imaging lens.

11. The electrophotographic image forming apparatus of claim 10, wherein the developing unit has a shape elongated in a scanning direction of the light scanning unit.

12. The electrophotographic image forming apparatus of claim 8, wherein the polygonal mirror comprises six reflection surfaces.

13. The electrophotographic image forming apparatus of claim 12, wherein a circle circumscribed by the polygonal mirror comprising the six reflection surfaces has a diameter of approximately 30 mm or less.

14. The electrophotographic image forming apparatus of claim 12, wherein the imaging lens comprises an fθ lens, the fθ lens having at least one non-spherical surface with a curvature continuously varying in a sub-scanning direction.

15. The electrophotographic image forming apparatus of claim 8, wherein the light source emits a plurality of light beams to form a plurality of scanning lines on the photoconductor, the scanning lines being spaced apart from each other in a sub-scanning direction.

16. A light scanning unit, comprising:
a light source;
a polygonal mirror deflecting light emitted from the light source in a main scanning direction;
an imaging lens including an fθ lens transmitting the deflected light to a photoconductor for forming an image;
a synchronization detecting unit detecting a synchronization signal from the deflected light for synchronization in the main scanning direction,
wherein the light scanning unit has a total scanning rate E1 including a synchronization detecting optical path and ranging from about 60% to 75%, the total scanning rate E1 being defined as follows, $$E1 = \frac{\theta 1}{\frac{360}{N} \times 2} \times 100$$

where θ1 is a total scanning angle, and N is the number of reflection surfaces of the polygonal mirror; and wherein the light scanning unit has an effective scanning rate E2 excluding the synchronization detecting optical path and ranging from about 60% to 70%, the effective scanning rate E2 being defined as follows, $$E2 = \frac{\theta 2}{\frac{360}{N} \times 2} \times 100$$

where θ2 is an effective scanning angle.

17. The light scanning unit of claim 16, wherein the synchronization detecting optical path is defined before the deflected light reaches the imaging lens.

18. The light scanning unit of claim 16, wherein the polygonal mirror comprises six reflection surfaces.

19. The light scanning unit of claim 18, wherein a circle circumscribed by the polygonal mirror comprising the six reflection surfaces has a diameter of approximately 30 mm or less.

20. The light scanning unit of claim 18, wherein the fθ lens has at least one non-spherical surface with a curvature continuously varying in a sub-scanning direction.

21. The light scanning unit of claim 16, wherein the light source emits a plurality of light beams to form a plurality of scanning lines on the photoconductor, the scanning lines being spaced apart from each other in a sub-scanning direction.

* * * * *